(12) United States Patent
Crowley et al.

(10) Patent No.: US 12,603,711 B2
(45) Date of Patent: Apr. 14, 2026

(54) AUDIO COMMUNICATION

(71) Applicant: Apple Inc., Cupertino, CA (US)

(72) Inventors: Patrick J. Crowley, Santa Clara, CA (US); Jason A. Granger, San Jose, CA (US); Collin J. Richardson, Livermore, CA (US)

(73) Assignee: APPLE INC., Cupertino, CA (US)

( * ) Notice: Subject to any disclaimer, the term of this patent is extended or adjusted under 35 U.S.C. 154(b) by 274 days.

(21) Appl. No.: 18/307,781

(22) Filed: Apr. 26, 2023

(65) Prior Publication Data

US 2024/0364430 A1 Oct. 31, 2024

(51) Int. Cl.
*H04B 11/00* (2006.01)

(52) U.S. Cl.
CPC ..................................... *H04B 11/00* (2013.01)

(58) Field of Classification Search
CPC ........ G04G 21/00; G04G 21/06; G04G 13/00; G04G 13/021; H04B 11/00
See application file for complete search history.

(56) References Cited

U.S. PATENT DOCUMENTS

| | | | |
|---|---|---|---|
| 4,144,706 A * | 3/1979 | Willis ..................... | G04G 13/02 |
| | | | 968/969 |
| 7,050,360 B2 * | 5/2006 | Saito ....................... | G04G 21/00 |
| | | | 368/230 |
| 10,149,521 B2 * | 12/2018 | Baranski .............. | A44C 5/0069 |

| | | | |
|---|---|---|---|
| 11,073,826 B2 * | 7/2021 | Cella ................... | G01M 13/045 |
| 2003/0179656 A1 * | 9/2003 | Saito ....................... | G04G 21/00 |
| | | | 368/230 |
| 2005/0249049 A1 * | 11/2005 | Jarrett ................ | G08B 21/0297 |
| | | | 368/250 |
| 2006/0022844 A1 * | 2/2006 | Kawashima ......... | G10K 11/004 |
| | | | 340/943 |
| 2007/0201313 A1 * | 8/2007 | Rudolph ............... | G04R 20/10 |
| | | | 368/47 |
| 2016/0058375 A1 * | 3/2016 | Rothkopf ............. | G04G 21/025 |
| | | | 600/323 |
| 2018/0027931 A1 * | 2/2018 | Baranski .................. | A44C 5/20 |
| 2019/0082800 A1 * | 3/2019 | Baranski .............. | A44C 5/2071 |
| 2019/0220166 A1 * | 7/2019 | Nagaraju ............... | G06F 3/016 |
| 2019/0277880 A1 * | 9/2019 | Kinoshita .............. | G01B 19/47 |
| 2020/0233380 A1 * | 7/2020 | Rothkopf ............. | A61B 5/0205 |
| 2021/0169417 A1 * | 6/2021 | Burton ................. | A61B 5/4857 |
| 2022/0006892 A1 * | 1/2022 | Perkins ................... | H01Q 5/25 |
| 2022/0108262 A1 * | 4/2022 | Cella ...................... | G05B 17/02 |
| 2023/0104612 A1 * | 4/2023 | Cella ................. | G05B 23/0297 |
| | | | 702/188 |

* cited by examiner

*Primary Examiner* — Daniel L Murphy
*Assistant Examiner* — Amie M Ndure
(74) *Attorney, Agent, or Firm* — Dorsey & Whitney LLP

(57) ABSTRACT

An electronic device can include a housing, a securement feature, a noise generator, a receiver, and a processor. The housing can define an internal volume. The securement feature can be connected to at least a first side and a second side of the housing and can extend between the first side and the second side. The noise generator can be connected to the securement featured and be configured to generate a sound with a frequency. The receiver can be disposed within the internal volume and be configured to receive the sound. The processor can be disposed within the internal volume and in communication with the receiver, and be configured to process the sound and perform an operation.

19 Claims, 10 Drawing Sheets

GENERATE 1ST
FREQUENCY                                        1304

GENERATE 2ND
FREQUENCY                                        1303

RECIEVE 1ST
FREQUENCY                                        1306

RECIEVE 2ND
FREQUENCY                                        1307

ASSOCIATE RECIEVED
1ST FREQUENCY WITH
1ST PROGRAM                                      1308

ASSOCIATE RECIEVED
2ND FREQUENCY WITH
2ND PROGRAM                                      1309

AUDIO COMMUNICATION

FIELD

The described examples relate generally to systems and methods for controlling an electronic device. More particularly, the present examples relate to the use of a frequency generator to generate desired frequencies to activate one or more programs on a device.

BACKGROUND

Recent advances in portable computing have enabled electronic devices that are worn on, and interface with, the body of the user. Many functionalities, including body sensing functionalities and other feedback systems, internet connectivity, cellular data capabilities, and other convenient functionalities have recently been incorporated into such wearable devices.

Wearable devices are generally designed to be compact in form and lightweight so as not to burden the user. The user's preference for compact and lightweight wearable devices, which include the various components needed to perform the multiple functions of the device, drives the need to further develop wearable electronic devices that are more compact, even as the number of functions and components within such devices increases.

Furthermore, the portable nature of wearable electronic devices has led to their use in a number of different environments while the user is performing any number of activities. For example, devices can be used in all types of recreational sports such as mountain biking or rock climbing. Accordingly, many wearable electronic devices can be exposed to extreme environments that can often limit the user's capability to operate the device. Therefore, a systematic approach to efficiently using the limited real estate on a wearable device is needed to allow for the continued development of capabilities as well as usability.

SUMMARY

In at least one example, an electronic device can include a housing, a securement feature, a noise generator, a receiver, and a processor. The housing can define an internal volume. The securement feature can be connected to at least a first side and a second side of the housing and can extend between the first side and the second side. The noise generator can be connected to the securement featured and be configured to generate a sound with a frequency. The receiver can be disposed within the internal volume and be configured to receive the sound. The processor can be disposed within the internal volume and in communication with the receiver, and can be configured to process the sound and perform an operation. In one example, the securement feature is a strap.

In one example, the noise generator is selected from a group including at least one of a snap cap, a slider cap, or a vibrational cap. The slider cap can include an elongated groove and a slider block. The elongated groove can have a first end and a second end. The slider block can be disposed within the groove and be configured to move between the first end and the second end such that an impact of the slider block against the first end generates the sound. In one example, the securement feature has a textured surface such that the textured surface is configured to generate the sound by an interaction of an external element with the textured surface.

In one example, the noise generator, the sound, the frequency, and the operation can be a first noise generator, a first sound, a first frequency, and a first operation, respectively. The electronic device can further be a second noise generator configured to generate a second sound with a second frequency. In one further example, the second frequency and the first frequency are different, and the processor is configured to process the second sound and perform a second operation in response to the second frequency.

In another further example, the electronic device includes a second receiver disposed within the internal volume. The first receiver can receive the first sound at a first time. The second receiver can receive the first sound at a second time, different than the first time, and the processor can be configured to perform the first operation. Additionally, the first receiver can receive the second sound at a third time, the second receiver can receive the second sound at a fourth time, different than the third time, and the processor can be configured to perform a second operation in response to the second sound.

In one example, the processor can be configured to perform the operation based on the frequency. In one example, the sound includes an acoustic wave with the frequency. In one example, the noise generator is removably connected to the securement feature. In at least one example, a strap for a smart watch including a microphone can include a first noise cap mechanically coupled to the strap at a first position, and configured to interface with the watch, and a second noise cap mechanically coupled to the strap at a second position. The first noise cap and the second noise cap can each include at least one of a snap cap, a slider cap, or a vibrational cap. In some examples, the first noise cap generates a noise having a first frequency, and the second noise cap generates a noise having a second frequency, different from the first frequency. Each of the first frequency and the second frequency corresponding to a different operation performed by the watch when detected. The first noise cap and the second noise cap can be removably coupled to the strap.

In at least one example, a programmable electronic device can include a housing defining an internal volume, a frequency receiver, and a processor. The frequency receiver can be disposed within the internal volume and can be configured to receive a signal with a frequency. The processor can be connected to the frequency receiver and can be configured to operate a program based on the frequency. In one example, the frequency is a user-defined frequency. In one example, the user-defined frequency is associated with the program of the electronic device. In one example, the signal is produced by an external sound generator. In one example, the programmable electronic further includes a securement feature mechanically coupled to the housing, and a sound generator operatively coupled to the securement feature.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
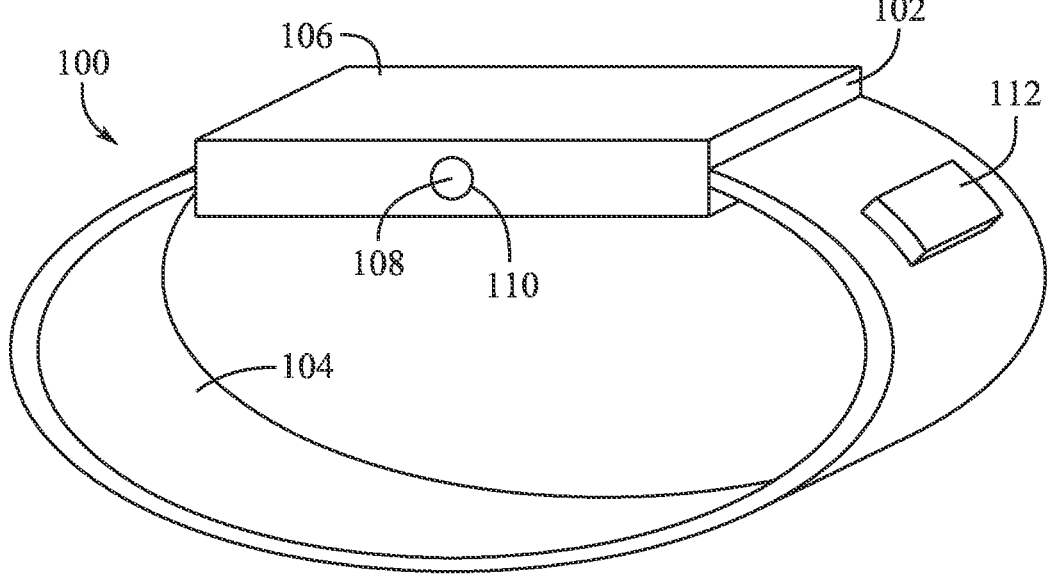
FIG. 1 illustrates an isometric view of a wearable electronic device with a housing, strap, and a noise cap, according to one example.

Reference will now be made in detail to representative examples illustrated in the accompanying drawings. It should be understood that the following descriptions are not intended to limit the examples to one preferred example. To the contrary, it is intended to cover alternatives, modifications, and equivalents as can be included within the spirit and scope of the described examples as defined by the appended claims.

The present disclosure generally relates to wearable electronic devices. More particularly, the present disclosure relates to systems and methods for utilizing acoustic signals to control one or more mobile applications or programs. In particular, the control of the one or more mobile applications or programs can be based on the frequencies of the acoustic signals, or other characteristics of the acoustic signals, such as time of flight. In one example, an electronic device can include a housing, a securement feature, a noise generator, a receiver, and a processor. The housing can define an internal volume. The securement feature can be connected to at least a first side and a second side of the housing, and can extend between the first side and the second side. The noise generator can be connected to the securement featured and be configured to generate a sound with a frequency. The receiver can be disposed within the internal volume and can be configured to receive the sound. The processor can be disposed within the internal volume and can be in communication with the receiver, and can be configured to process the sound and perform an operation.

Wearable electronic devices have become smaller and more complex over time. The demand from users to have a smaller and less bulky device that they can wear, while still having connectivity, places an increased demand on manufactures to improve the efficiency with which the wearable device real estate is used. Users often want wearable devices to be small and relatively unnoticeable when worn. They also want to have all or most all of the same functionality that their smart phones and tablets have, so that they can remain as productive and efficient as possible. However, due to the size of the devices, most manufactures tend to be limited in what the wearable device can do. Adding increased functionality can often lead to increased stress on the battery component, which typically reduces the battery life of the device. However, adding additional or larger size batteries can take up valuable real estate in the device. This can lead to decreased user satisfaction. Accordingly, manufactures of wearable devices need to develop cost efficient, small, functional additions that can be implemented without making the device feel bulky or heavy.

Additionally, users are increasingly demanding a durable and more rugged aspect of the wearable device to be present. This is due to the potential extreme environments that the device can be used. Many users rely on their devices for health tracking using one or more mobile applications to monitor and track their vital statistics in conjunction with their performance for a particular activity. For example, some users may use the wearable device to determine their heart rate and elevation gain while mountain biking, hiking, jogging, etc. Other users may use the device to track depth and time of a particular underwater dive.

Various examples described herein are directed to systems and methods that can utilize relatively unused real estate on the wearable device, in conjunction with existing hardware, to expand the user landscape and user capabilities of the wearable devices. In at least one example, an electronic device, as described in the various examples herein, can be configured to operate or be controlled, in part, by an acoustic or mechanical signal containing a particular frequency. In many examples, the wearable device can have a way to generate such an acoustic signal that does not require the use of additional batteries or electronics, and can generate an acoustic signal with a frequency within a desired range (e.g., an acoustic signal can be or include a sound within the range of human hearing, approximately 20 Hertz (Hz) to 20 kilo-Hertz (kHz)). The acoustic signal can then be received through one of the onboard microphones or other receivers in the device. Once the electronic device has received the acoustic signal, it can then process it such that the device can activate a particular program or perform a certain operation correlating to the acoustic signal. In some examples, a mechanism for generating the acoustic signal can be sufficiently small to be located on a band or other securement feature of the device such that it is located near the device itself. This can reduce the potential for interference from other outside noises because the device can be programmed to process the acoustic signal and determine the frequency based on factors such as intensity and time of arrival.

In at least one example, the acoustic signal can be generated by a source external to the wearable device itself. Notwithstanding, the device could be programmed to recognize the acoustic signal and the particular frequency within any reasonable distance. Accordingly, the device could be activated upon receipt of the acoustic signal that it has been trained or programmed to receive. This can be highly advantageous for users that may experience dexterity issues and are not capable of using the touch screen of the device, or for users who may not be capable of using their voice to activate the device. For example, when operated in extreme cold environments, the gloves of a user may prevent the user from accurately using the touch screen or any of the buttons on the side of the device. Additionally, an underwater diver would not be able to use their voice to activate the device. Accordingly, many examples can help alleviate that problem without further burdening the form factor of the device or the electronic strain on the battery. Acoustic signals can be generated in a number of different ways that are easy to use and do not place additional burdens on the device itself. This can help expand the functionality of the wearable device in a variety of environments and situations.

These and other examples are discussed below with reference to FIGS. 1-14. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates an isometric view of a wearable electronic device 100 with a housing 102, strap 104, and an analog noise generator, such as a noise cap 112, according to one example. In at least one example, the wearable electronic device 100 can be a smart watch. In some examples, the wearable electronic device 100 can be a programmable electronic device, or other electronic device, such as a portable electronic device, a cellular phone, a laptop, a tablet, or the like. The housing 102 can define an interval volume which houses various components of the wearable electronic device 100. The various components can include processing boards, controllers or microcontrollers, memory, antennas, communication devices (such as receivers and transmitters), microphones, speakers, at least parts of a display, such as display 106, etc. In some examples, the housing 102 at least partially defines an internal volume. For example, the display can include a screen which is not disposed within the internal volume of the housing 102.

The display 106 can include a screen, such as a touch screen, for user interaction with the wearable electronic device 100. For example the user can control the wearable electronic device 100 and can interact with various programs, applications, and features of the wearable electronic device 100 via the display 106.

Figure 2:
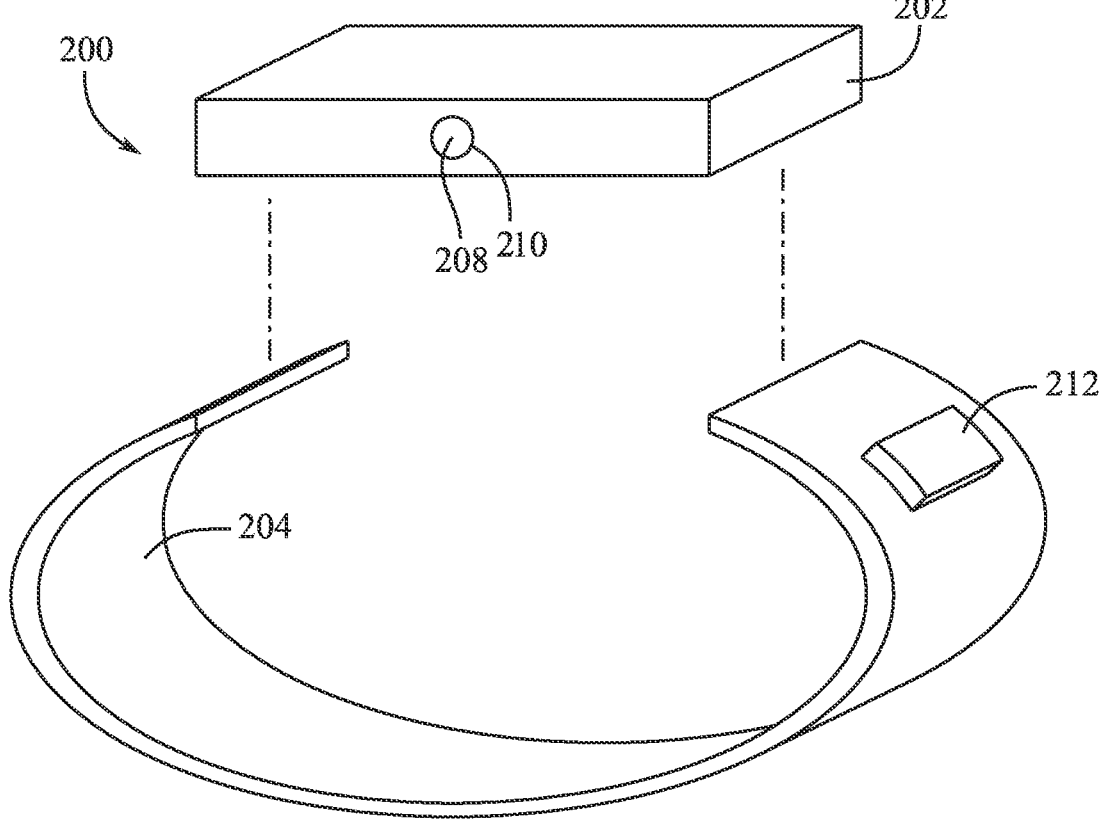
FIG. 2 illustrates an example of a wearable electronic device with a strap that is removable from a housing, according to one example.
Figure 3:
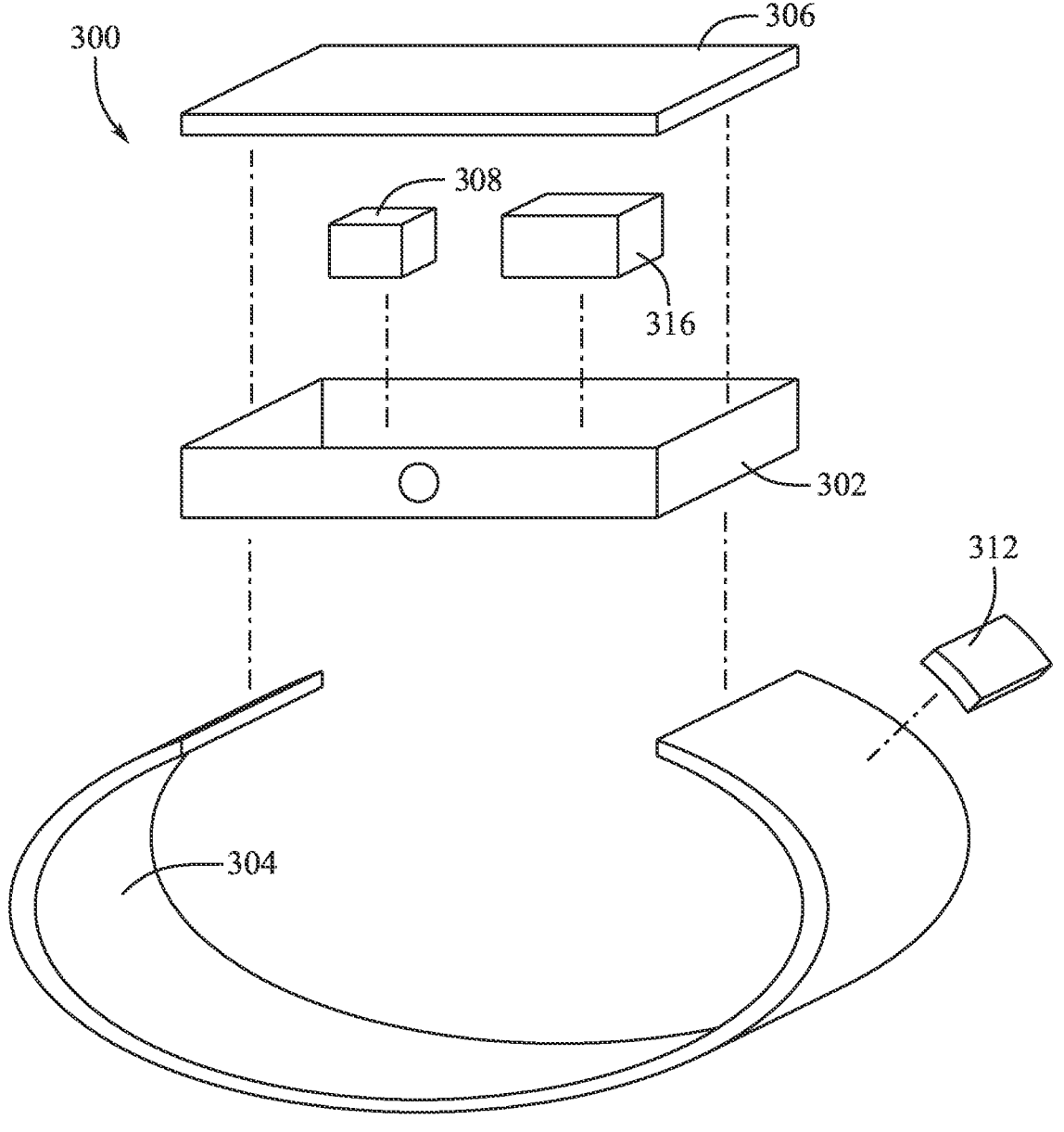
FIG. 3 illustrates an exploded view of a wearable electronic device with a microphone and a processor, according to one example.

The strap 104 can be mechanically coupled to the housing 102. In particular, the strap 104 can be connected to at least a first side and a second side of the housing 102, and can extend between the first side and the second side. For example, the strap 104 can be connected to the housing 102 via fastening devices, such as pins, magnets, screws, or the like. In some examples, as depicted in FIGS. 2-3, the strap 104 can be removably coupled to the housing 102 by the fastening devices, such that the user can switch between different straps. In other examples, the strap 104 can be permanently coupled to the housing 102. For example, the strap 104 can be glued to, or formed as an integral part of, the housing 102. The strap 104 can include features, such as a buckle or a slide which allow its length to be adjustable. The strap 104, in various examples, can be a band, a belt, or any suitable securement feature that can allow for the housing 102 to be secured to a user.

The analog nose generator or noise cap 112 can be a non-electronic sound-generating feature of the wearable electronic device 100. The noise cap 112 can generate a sound with a given frequency. The noise cap 112 can be a small device that is disposed on the strap 104. In particular, the noise cap can be small enough to be disposed on the strap 104 without causing significant obstruction or inconvenience to the user. In some examples, the noise cap 112 is removably and mechanically connected to the strap 104, such as by a button, a pin, a magnet, etc. In other examples, the noise cap 112 can be permanently fixed to the strap 104.

The wearable electronic device can include a microphone 108 disposed within an internal volume of the housing 102. The microphone 108 can be exposed to the external environment via a port 110. The port can be of any shape or size such that it allows for external sounds to be received by the microphone 108 of the wearable electronic device 100. The microphone 108 can be a microphone designed to receive sounds with frequencies approximately within a human audible range. In some examples, the microphone 108 can also receive sounds with frequencies outside (e.g., both greater than and less than) of the audible human range. In some examples, the microphone 108 can perceive sounds that have a volume that is below average human threshold for perception. In some examples, the microphone 108 can detect sounds from the noise cap 112. In some examples, alternatively or additionally to including the microphone 108, the wearable electronic device can include a piezoelectric accelerometer that can detect minute vibrations generated by the audio signal. Although not depicted in FIGS. 1-3, the wearable electronic device can include more than one microphone.

In accordance with various examples, the strap 104 can be configured with a noise cap 112. The noise cap 112 can be any suitable element that can generate the audio signal to be received by the microphone 108. For example, the noise cap 112 can be a snapping button cap, a spring loaded slider, a tensioned string or membrane, or the like. The noise cap 112 can be located at any suitable location on the strap 104. Although not depicted in FIGS. 1-3, the wearable electronic device 100 can include more than one noise cap located on the strap 104.

In many examples, the noise cap 112 can be configured to generate a sound or a vibration at a particular frequency. That frequency can vary depending on the individual characteristics and components that are used to make the noise cap 112. The frequency generated by the noise cap 112 can be programmed to the wearable electronic device 100 such that the frequency generated is associated with a particular application, program, or operation. For example, if a runner wanted to program the wearable electronic device 100 to track the number of laps that have been run, they could program the wearable electronic device 100 to recognize the frequency generated by the sound cap 112. That frequency could be any desired frequency such that once it was detected by the microphone 108, the device 100 would activate a split or add a count to the number of laps being tracked. This could be done for any number of different applications. The user could preprogram the wearable electronic device to recognize the frequency generated, and then associate that frequency with the application and function thereof to allow the wearable electronic device 100 to perform that particular function.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

FIG. 2 illustrates an example of a wearable electronic device 200 with a strap 204 that is removable from a housing 202, according to one example. The wearable electronic device 200 and each of its components can be substantially similar to the wearable electronic device 100 of FIG. 1, as noted by similar reference numbers. For example, in various examples, the housing 202 and the securement feature or strap 204 can be separable or removably connected. For example, the strap 204 can be connected to the housing 202 via fastening devices, such as pins, magnets, screws, or the like, allowing the strap to be detached and reattached to the housing 202. This can allow the user to remove the strap 204 completely and attach a new strap 204 to the housing. This can allow a user to interchange or exchange the strap based on the desired activity. For example, one strap could have a noise cap 212 that is associated with one particular program of the wearable electronic device 200 for running (e.g., the noise cap 212 generates a sound with a particular frequency) and another strap could have a noise cap 212 that is associated with an application for scuba diving (e.g., the noise cap 2112 generates a sound with a different frequency). Each strap 204 could be modular and the user could have any number of different straps 204. Additionally, the user could associate and disassociate various noise caps 212 to any particular application and function within the application. This could allow for freedom and flexibility in the user being able to change and adjust what the noise cap 212 activates. If the user decides that scuba diving is only done once a year or will never be done again, then they can reprogram the wearable electronic device 200 to associate the frequency generated by a specific noise cap 212 with a new application. Such examples could use similar features like the microphone 208 to train and retrain the device 200 to function accordingly.

Any of the features, components, and/or parts, including the arrangements and configurations thereof shown in FIG. 2 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 2.

FIG. 3 illustrates an exploded view of a wearable electronic device 300 with a microphone 308 and a processor 316, according to one example. The wearable electronic device 300 and each of its components can be substantially similar to the wearable electronic devices 100 and 200 of FIGS. 1-2, as noted by similar reference numbers. As can be appreciated, the housing 302 can be configured to support or house a variety of different electronic components, such as a microphone 308 and a processor 316. In particular, the microphone 308 can be disposed within the internal volume of the housing 302 and can receive an acoustic signal, such as one generated by a noise cap 312. The processor 316 can also be disposed within the internal volume of the housing 302, can be in communication with the microphone 308, and can be configured to process the acoustic signal and perform an operation based on a frequency of the acoustic signal. Additionally, the processor 316 can help in the receipt and processing of other various audio signals and communications. This can include those generated by the noise cap 312, as well those from other external frequencies that may need to be differentiated from the noise cap 312 signal to avoid interference.

In many examples, the microphone 308 can include or can be an internal microphone that can be electrically or wireless connected to the processor 316. The processor 316 can take on any suitable element that can process received signals and then perform an operation or activate a desired application or program. It should be appreciated, that, although not necessarily depicted in FIG. 3, various examples of the wearable electronic device 300, can have a variety of other electronic components such as a screen 306, batteries, other processors, circuit boards, and/or other sensors in the housing 302. Many such examples can use the variety of different components in conjunction with the processor 316 to allow the user to interface with the various features, functions, applications, and/or programs of the wearable electronic device 300.

In some examples, the noise cap 312 can be removably coupled to the strap 304 such that a user can remove and replace the noise cap 312 at will. This can allow a user to interchange the noise cap 312, depending on the activity they are doing or the desired response of the wearable electronic device 300 to acoustic signal generated by the noise cap 312. As such, the noise cap 312 can take on any suitable form and can have any number of different features that allow it to generate the desired acoustic signal and corresponding frequency. In one example, the noise cap 312 can be a snapping button cap which can create a sound (e.g., an acoustic signal) which include a given frequency when a button is pressed. In another example, the noise cap 312 can be a spring-loaded slider which includes a slider bar that can be swiped to one side and released. The spring loaded slider can include a tuned rod that the slider collides with when released to generate the acoustic signal. In another example, the noise cap 312 can be a guitar string or another tensioned surface that, when plucked or hit, can generate the acoustic signal. Each of these examples will be further described at least with respect to FIGS. 7-11.

Any of the features, components, and/or parts, including the arrangements and configurations thereof shown in FIG. 3 can be included, cither alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

Figure 4:
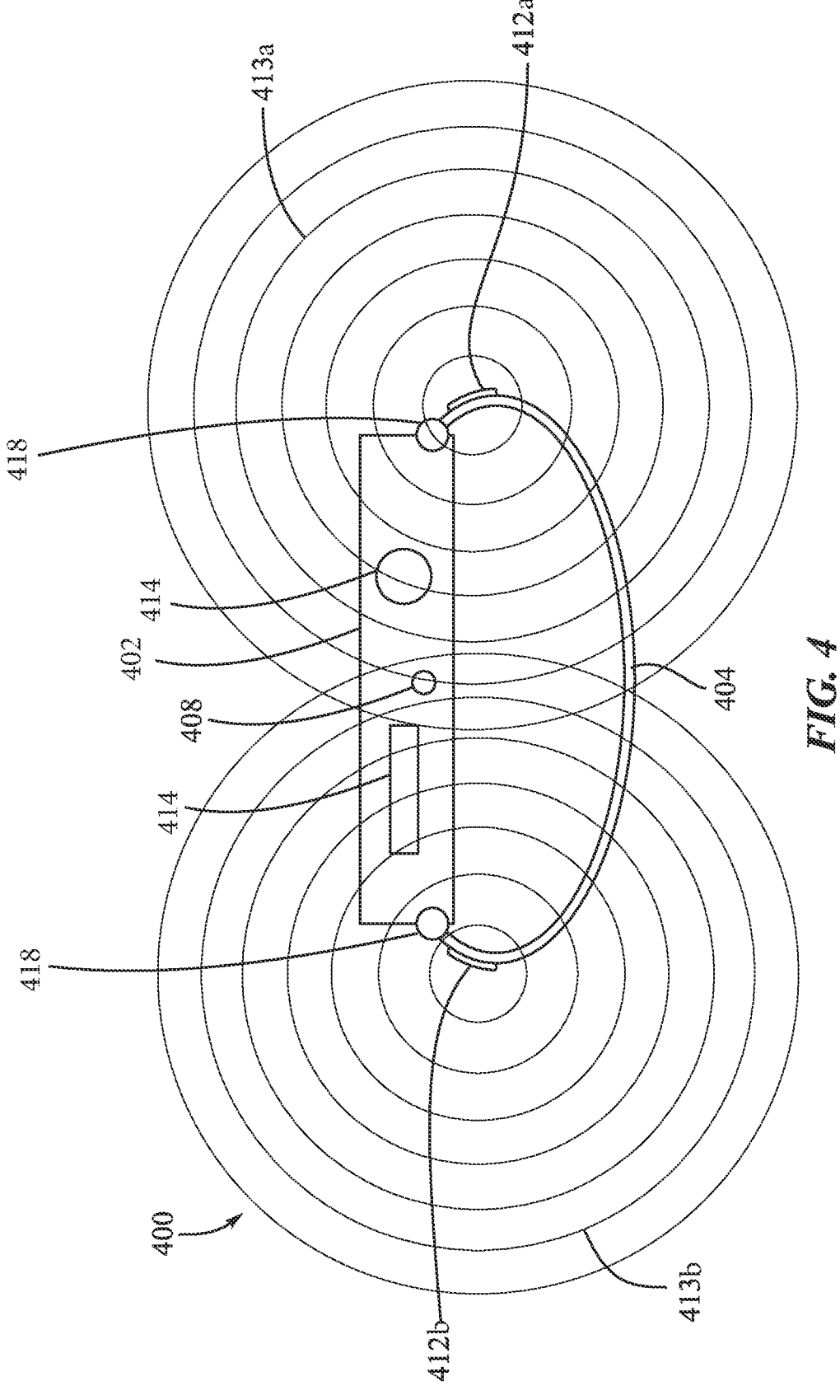
FIG. 4 illustrates a smart watch including a microphone, a first noise cap, and a second noise cap, according to one example.

FIG. 4 illustrates a smart watch 400 including a microphone 408, a first noise cap 412a and a second noise cap 412b, according to one example. The smart watch 400 and each of its components can be substantially similar to the wearable electronic devices 100, 200, or 300 of FIGS. 1-3, as noted by similar reference numbers. The smart watch 400 can include a housing 402 defining an internal volume and a microphone 408 disposed within the internal volume.

The smart watch 400 also can include a strap 404 mechanically coupled to the housing 402. One end of the strap 404 can be mechanically coupled to a first side of the housing 402 and an opposite end of the strap 404 can be mechanically coupled to a second side of the housing 402 using fasteners 418 or any other mating connection system. In at least one example, the strap is removably coupled to the housing 402, e.g., pins, Velcro®, magnets, clasps, screws, mating features, or the like. In other examples, the strap 404 can be permanently coupled to the housing 402, e.g., by being manufactured as such, or by using adhesives. In some examples the strap 404 can be flexible and the fasteners can allow for rotation of the strap 404 about the points of fastening, such that the strap 404 can conform to a wrist of the user. The smart watch 400 can also include other components such as buttons 414. The buttons 414 can include power buttons, volume buttons, or the like.

The noise cap 412a (e.g., a first noise cap) can be mechanically coupled at a first position on the strap 404, and the noise cap 412b (e.g., a second noise cap) can be mechanically coupled at a second position on the strap 404. In at least one example, the noise caps 412a-b are removably coupled to the strap 404. For example, the noise caps 412a-b can be mechanically coupled using buttons, pins, Velcro®, magnets, clasps, screws, or the like. In other examples, the noise caps 412a-b can be permanently coupled to the strap 404, e.g., by being manufactured or molded as such, or by using adhesives. It should be noted that the noise cap 412a and the noise cap 412b can be coupled to the strap 404 via different mechanisms, and either or both can be removably or permanently coupled.

The noise caps 412a-b can be any type of noise generator, such as a snap cap, a slider cap, a vibrational cap, or the like. The noise caps 412a-b do not necessarily need to be the same type of noise generator. In some examples, each of the noise caps 412 can be selected from a group including the snap cap, the slider cap, or the vibrational cap. The noise cap 412a can be configured to generate a first sound 413a at a first frequency, and the noise cap 412b can be configured to generate a second sound 413b at a second frequency. In some examples, the first sound 413a and the second sound 413b can each include a plurality of frequencies, but each of the first sound 413a and the second sound 413b are dominated by the first frequency and the second frequency, respectively. In other words, the first sound 413a and second sound 413b are each an acoustic signal which includes (and is dominated by) at least one acoustic wave with the first frequency and the second frequency, respectively. Thus, in the descriptions of the present disclosure, reference to a first frequency and a second frequency implies that these are the frequencies which dominate the respective sound.

In some examples, the first frequency and the second frequency are selected (e.g., by a design of the noise caps 412a-b) to be within human audible range (approximately 20 Hz-20 kHz). Additionally, the first frequency and the second frequency can be selected such that a difference in their value is perceivable by the microphone 408. In one example, the first frequency can be 6 kHz and the second frequency can be 8 kHz. In some examples, the first frequency and/or the second frequency can be selected to be outside of the human audible range (e.g., less than 20 Hz or greater than 20 kHz), but are still be perceivable by the microphone 408.

In at least one example, the microphone 408 can be configured to receive a sound generated by at least one of the noise caps 412a-b. A processor, such as the processor 316, can process the sound received by the microphone 108, and can determine a (dominant) frequency of the sound. The processor can perform an operation based on the determined frequency. The operation can include activating a program or routine (e.g., starting a timer, ending a timer, turning on a built-in flashlight feature, opening an application, etc.).

In at least one example, the user can deploy the noise cap 412a to generate the first sound 413a with the first frequency. The first sound 413a can be received by the microphone 408 and the processor can determine that the first sound 413a has the first frequency, and can be configured to cause the smart watch to perform a first operation based on identifying the first frequency. The first operation can be predetermined, or can be pre-programmed into a memory of the smart watch 400.

Additionally or alternatively, the user can deploy the noise cap 412b to generate the second sound 413b with the second frequency. The second sound 413b can be received by the microphone 408, and the processor can then determine that the second sound 413b has the second frequency. In at least one example, the second frequency and the first frequency are different, and the processor can be configured to cause the smart watch to perform a second operation based on identifying the second frequency. The second operation can be different than the first operation. The second operation can be predetermined, or can be pre-programmed into a memory of the smart watch 400.

In at least one example, the smart watch 400 can have a single noise cap which can be configured to generate two or more distinct sounds, each with their own distinct frequencies. In some examples, a noise cap can have two, three, four, or more buttons which each produce a sound with a different frequency when pressed. In some examples, a noise cap can have two, three, four, or more sliders, which each produce a sound with a different frequency when the slider collides with the corresponding tuned rods. In some examples, a noise cap can have two, three, four, or more tensioned bands which each produce a different tone when plucked. The processor can be configured to perform a different operation depending on which sound and corresponding frequency is received by the microphone 408.

In at least one example, the smart watch 400 can have more than two sound caps. For example, the smart watch 400 can have three, four, or more sound caps, which each generate a different sound with a distinct frequency. The processor can be configured to perform a different operation depending on which sound and corresponding frequency is received by the microphone 408.

Any of the features, components, and/or parts, including the arrangements and configurations thereof shown in FIG. 4 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 4.

Figure 5:
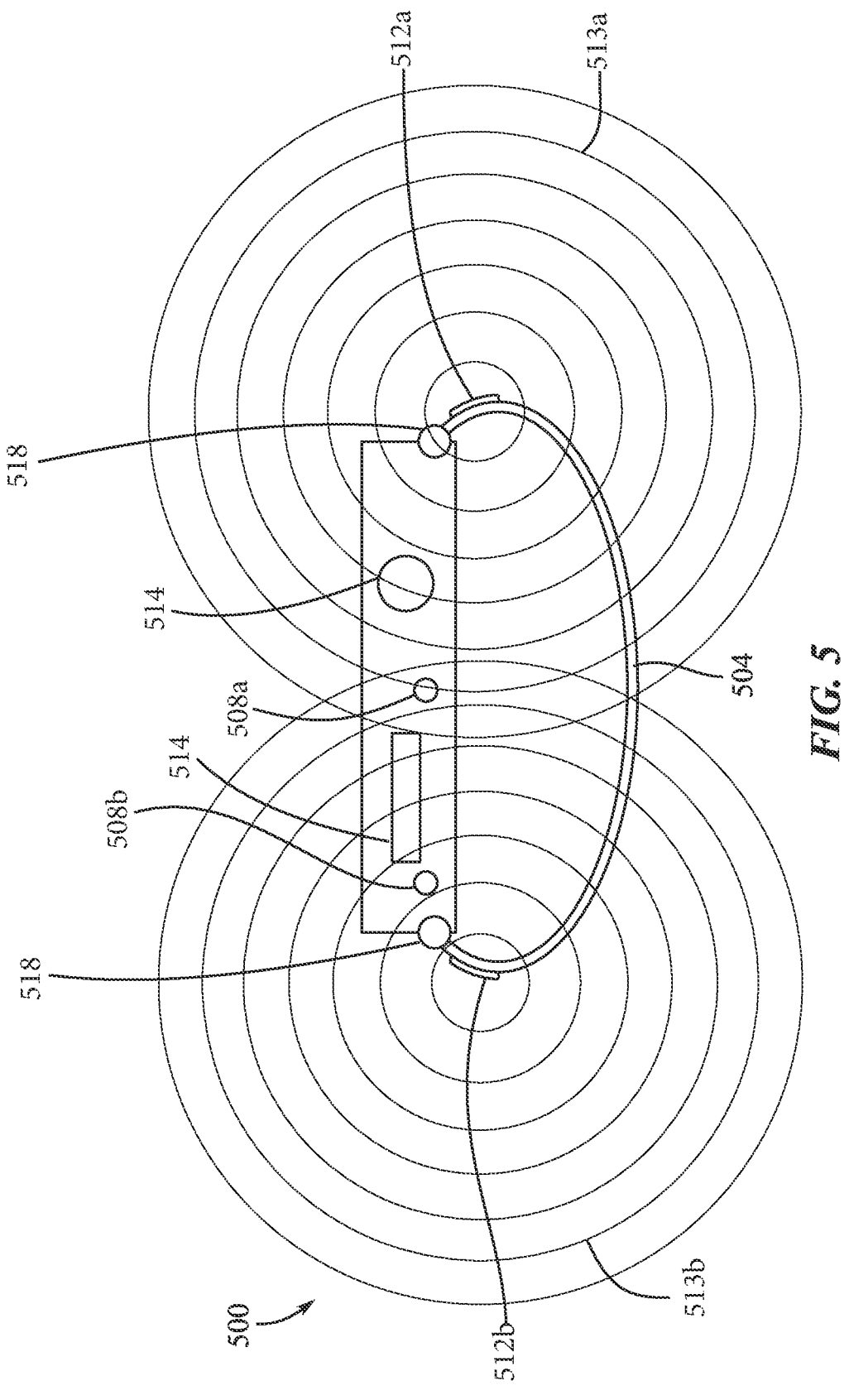
FIG. 5 illustrates a smart watch including a microphone, a microphone, a first noise cap, and a second noise cap, according to one example.

FIG. 5 illustrates a smart watch 500 including a microphone 508a (such as a first microphone), a microphone 508b (such as a second microphone), a noise cap 512a (such as a first noise cap), and a noise cap 512b (such as a second noise cap), according to one example. The smart watch 500 and each of its components can be substantially similar to the smart watch 400 as noted by similar reference numbers, except that the smart watch 500 has more than one microphone. In the depicted example, the smart watch 500 has two microphones, however, in other examples, a smart watch can have more than two microphones, such as three, four, five, etc. which function individually and collectively as described below with respect to the microphones 508a-b. The microphone 508a (e.g., the first microphone) can be disposed at a first location within the internal volume of the housing 502 and the microphone 508b (e.g., the second microphone) can be disposed at a second location, different from the first location, within the internal volume of the housing 502. Furthermore, the noise cap 512a can be disposed at a first position on the strap 504 and the noise cap 512b can be disposed at a second position, different from the first position, on the strap 504.

In at least one example, each of the noise caps 512a-b can generate a sound at the same frequency (e.g., 6 kHz, 8 kHz, 10 kHz, etc.). The noise cap 512a can be configured to generate a first sound 513a at a particular frequency and the noise cap 512b can be configured to generate a second sound 513b at the same particular frequency. In this case, the microphones 508a-b may not be able to distinguish which noise cap 512a-b has generated the first sound or the second sound, and thus, may not be able to determine which operation to perform based on the frequency.

Because sound travels at a finite speed, there is a measurable time (referred to as a latency) between when the sound is generated (e.g., by a noise cap) and when the sound is received (e.g., by a microphone). Therefore, because the microphone 508a and the microphone 508b are located at different locations within the internal volume, and the noise cap 512a and the noise cap 512b are positioned at different positions on the strap 504, a latency can be defined between each respective pair of microphones 508a-b and noise caps 512a-b.

In at least one example, the noise cap 512a can generate a first sound 513a. The microphone 508a can receive the first sound 513a at a first time and the microphone 508b can receive the first sound 513a at a second time that is different than the first time. Using the illustration of FIG. 5 as an example, the sound 513a from the noise cap 512a reaches the microphone 508a at the first time and reaches the microphone 508b at the second time, which is later than the first time. In particular, the sound 513a reaches the microphone 508a before it reaches the microphone 508b. Based on the time difference (e.g., based on the microphone 508a receiving the sound 513a first), the processor can determine that the sound 513a originated from the sound cap 512a and can be configured to perform a first operation.

Additionally or alternatively, the noise cap 512b can generate a second sound 513b. The microphone 508a can receive the second sound 513b at a third time and the microphone 508b can receive the second sound 513b at a fourth time that is different than the third time. Using the illustration of FIG. 5 as an example, the sound 513b from the noise cap 512b reaches the microphone 508a at the third time and reaches the microphone 508b at the fourth time, which is earlier than the third time. In particular, the sound 513b reaches the microphone 508a after it reaches the microphone 508b. Based on the time difference (e.g., based on the microphone 508a receive the sound 513b second), the processor can determine that the sound 513a originated from the sound cap 512b and can be configured to perform a second operation.

In at least one example, a distance between the microphone 508a and the microphone 508b can be approximately 18 millimeters (mm), and the first sound 513a can reach the microphone 508a approximately 50 microseconds (μs) before it reaches the microphone 508b, while the second sound 513b can reach the microphone 508a approximately 50 μs after it reaches the microphone 508b. In other examples, the time difference between when the microphones 508a-b receive a sound can depend on other factors, such as a different distance between the microphones 508a-b, the ambient temperature, the ambient medium (e.g., air, water, etc.), and the like.

In at least one example, the smart watch 500 can have more than two noise caps that are positioned at distinct positions on the strap 504. For example, the smart watch 500 can have three, four, five, or more noise caps. The noise caps can be spaced equally along the strap 504, or can be positioned at arbitrary positions. Any of the noise caps can produce a sound which reaches each of the microphones 508a-b at different times (assuming that a distance between the noise cap and each of the microphones 508a-b is different). The processor can be programmed to determine a time difference between the arrivals of a sound, and perform an operation based on the time difference.

In at least one example, the methods described with respect to FIG. 4 and FIG. 5 to initiate the performance of an operation can be combined. For example, a sound with a specific frequency can cause an operation to be performed based on the frequency, while a sound with a different frequency can cause an operation to be performed based on the time difference.

Any of the features, components, and/or parts, including the arrangements and configurations thereof shown in FIG. 5 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 5.

Figure 6:
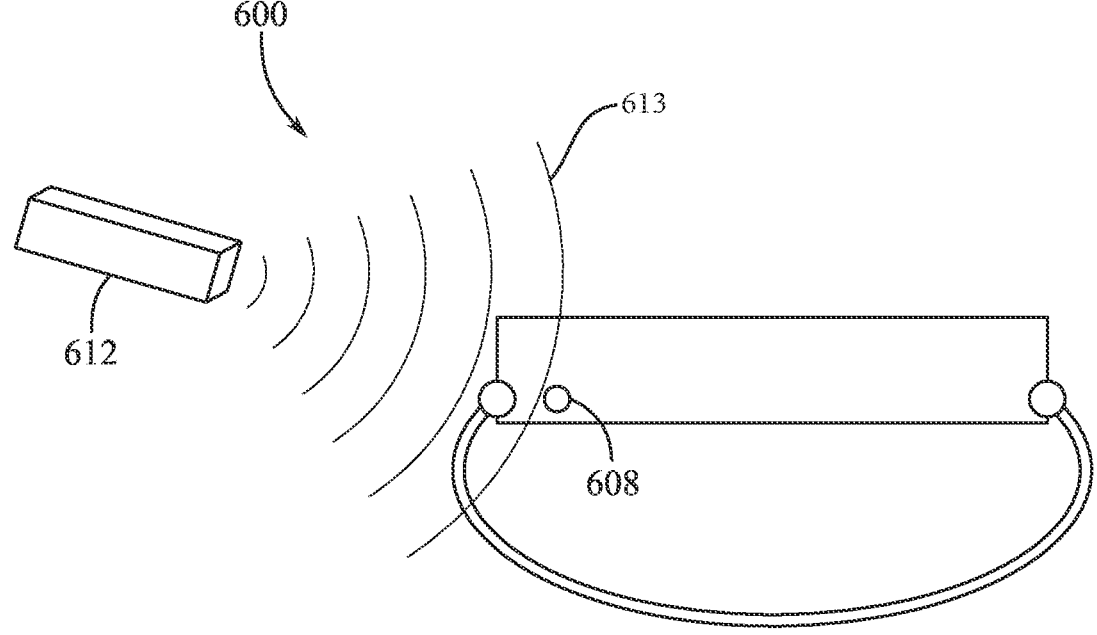
FIG. 6 illustrates a smart watch configured to receive a signal from a sound generator, according to one example.

FIG. 6 illustrates a smart watch 600 configured to receive a signal 613 from a sound generator 612, according to one example. Although not all of the components are shown, the smart watch 600 can be substantially similar to the smart watches 400 and 500 of FIGS. 4-5. Similar to the smart watches 400 and 500, the smart watch 600 can be configured to perform an operation based on receiving a signal with a certain frequency. The signal can be a sound which is generated by the sound generator 612 and received by the microphone 608. The processor of the smart watch 600 can be configured to perform an operation based on the frequency of the received signal.

The signal 613 can be produced by a sound generator. 612. The sound generator 612 can be an external sound generator and can be any source which can generate the signal 613 (e.g., a sound) with a specific frequency that is perceivable by the microphone 608. As can be fully appreciated, the various examples discussed herein allow for the smart watch 600 to be controlled or activated by the signal 613 from the external source. The signal 613 can be generated by any number of devices and the smart watch 600 can be trained or programmed to recognize that frequency and associate it with a desired program or application.

In some examples, the sound generator 612 can be completely external to the smart watch 600. For example, some examples may use a whistle or other sound generation device to generate the signal 613. Other examples of a signal 613 could include a starting pistol for a race, an alarm from a dive computer, a sound generated by a phone, etc. The frequency of the signal 613 can be a user-defined frequency. For example, a whistle can be designed to whistle with a selected frequency, as chosen by the user based on associating the frequency with the desired program or application. In other words, the user-defined frequency can be associated with a desired program of the smart watch 600. In other examples, the sound generator 612 can be part of the smart watch 600 and can be operatively coupled to a securement feature (e.g., strap) of the smart watch 600.

In one example, the signal 613 can be the whistle, which can trigger an operation such as starting a timer, stopping a timer, lapping a timer, etc. In one example, the signal 613 can be a gun/pistol shot, which can trigger an operation such as starting/stopping/lapping a timer, opening a horse race gate, etc. In one example, the signal can be generated by a separate electronic device (e.g., a cell phone, laptop, tablet, smart watch, or other electronic device), which can trigger an operation such as opening a media player, starting/pausing media, adjusting volume, setting an alarm, adjusting power settings, etc. In one example, the signal 613 can be an avalanche or mudslide sound and can provide an indication to a location and scale of the avalanche or mudslide. In one example, the signal 613 can be scuba diving system noises, avalanche beacon noises, or the like. In other examples, the signal 613 can be or can include smoke alarms, carbon monoxide alarms, tornado warnings, emergency service sirens, vehicle horns, or the like.

In some examples, the smart watch 600 can utilize the microphone 608 in the housing 602 to train the internal processor to respond to the frequency of the signal 613. This can be advantageous in any number of situations in which the user may not be able to manually activate a noise cap, such as while performing certain activities. Additionally, the ability to train or program the smart watch 600 to respond to signal 613 from an external sound generator can expand the functionality of the smart watch 600 for the user. This can allow the smart watch 600 which is responsive to a noise cap that is native to the device, to also be responsive to signal 613 from an external source, allowing the user to avoid changing the bands or generators when not needed.

Any of the features, components, and/or parts, including the arrangements and configurations thereof shown in FIG. 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6.

Figures 7, 8, 9, 10, 11:
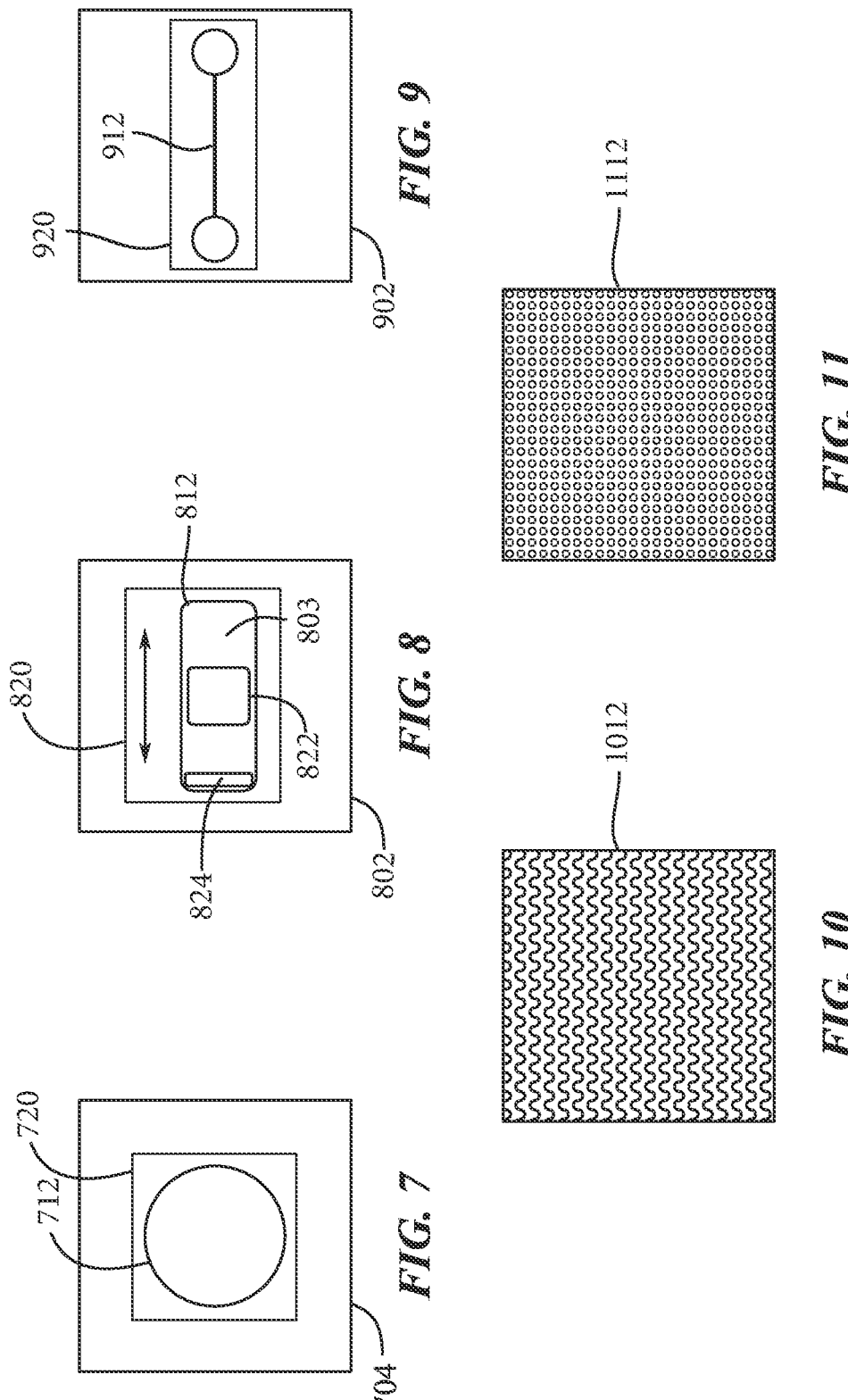
FIG. 7 illustrates a button cap mechanically coupled to a securement feature, according to one example.
FIG. 8 illustrates a slider cap mechanically coupled to a securement feature, according to one example.
FIG. 9 illustrates a vibrational cap mechanically coupled to a securement feature, according to one example.
FIG. 10 illustrates a textured noise cap, according to one example.
FIG. 11 illustrates a textured noise cap, according to one example.

FIG. 7 illustrates a button cap 712 mechanically coupled to a securement feature 704, according to one example. In at least one example, the securement feature 704 can be a strap, such as described with respect to FIGS. 1-5. In other examples, the securement feature 704 can be a band, belt, or other device to secure a wearable electronic device to a user.

The button cap 712 can be a noise cap, such as described with respect to FIGS. 1-6, to generate a sound with a particular frequency. A user can press the button cap 712 to generate the sound. The button cap 712 can be a push button, a spring button (such as a clicker), an elastic button (that depends on the elasticity of the material), a rubber or silicone button, or the like. The frequency of the sound generated by the button cap 712 can be fixed at manufacturing, and can depend on various factors, such as the type of spring used, a spring constant of the spring, material of the button, size of the button, etc. In some examples, pressing the button can generate a short burst of sound, such as a click or a pop.

In some examples, the button cap 712 can be positioned within a separate housing 720 that can be installed and/or removed from the securement feature 704 of any of the wearable devices illustrated herein. Likewise, any example of a button cap 712 can be confined within a distinguishable housing 720 that can allow the button cap 712 to be modular. Some examples can also allow for the various noise caps to be integrated with the securement feature 704 to be irremovably fixed to the securement feature 704. In other examples, the button cap 712 can be mechanically fixed to the securement feature 704 without a need for the separate housing 720.

FIG. 8 illustrates a slider cap 812 mechanically coupled to a securement feature 804, according to one example. In at least one example, the securement feature 804 can be a strap, such as described with respect to FIGS. 1-5. In other examples, the securement feature 804 can be a band, belt, or other device to secure a wearable electronic device to a user.

The slider cap 812 can be a noise cap, such as described with respect to FIGS. 1-6, to generate a sound with a particular frequency. The slider cap 812 can include a slider block 822 disposed within a channel 803. The channel 803 can be an elongated groove or cutout with a first end and a second end. The slider block 822 can be located within the channel 803 and can be configured to move between the first end and the second end such that an impact of the slider block 822 against the first end generates the sound.

In at least one examples, the slider cap 812 further includes a tuned rod 824 that can be disposed at a first end of the channel 803. The tuned rod 824 can be a metallic rod, a plate, or a cone that is tuned to generate a sound at a particular frequency upon impact from the slider block 822.

In at least one example, the slider cap 812 can include a first spring mechanically coupled between the first end of the channel 802 and the slider block 822. The first spring can be in equilibrium when the slider block 822 is positioned at the first end of the channel 803, such that when the slider block 822 is moved towards the second end, the spring is stretched. When the slider block 822 is subsequently released, the spring force causes the slider block 822 to accelerate and impact the tuned rod 824.

In at least one example, the slider cap 812 can include a second spring mechanically coupled between the second end of the channel 802 and the slider block 822. The second spring can be in equilibrium when the slider block 822 is positioned at the first end of the channel 803, such that when the slider block 822 is moved towards the second end, the spring is compressed. When the slider block 822 is subsequently released, the spring force causes the slider block 822 to accelerate and impact the tuned rod 824. In general, the slider block 822 can be resiliently bound within the channel 803 (by a spring, an elastic band, or the like) such that when pulled in one direction, the release thereof would allow the slider block 822 to automatically move towards the opposite end. As can be appreciated, such examples can have any configuration whether horizontal, vertical, or at any angle and can be made of any suitable material to allow for the movement of the slider block 822.

In some examples, the slider cap can be positioned within a separate housing 820 that can be installed and/or removed from the securement feature 804 of any of the wearable devices illustrated herein. Likewise, any example of a slider cap 812 can be confined within a distinguishable housing 820 that can allow the slider cap 812 to be modular. Some examples can also allow for the various noise caps to be integrated with the securement feature 804 to be irremovably fixed to the securement feature 804. In other examples, the slider cap 812 can be mechanically fixed to the securement feature 804 without a need for the separate housing 820.

FIG. 9 illustrates a vibrational cap 912 mechanically coupled to a securement feature 904, according to one example. In at least one example, the securement feature 904 can be a strap, such as described with respect to FIGS. 1-5.

In other examples, the securement feature 904 can be a band, a belt, or another device to secure a wearable electronic device to a user.

The vibrational cap 912 can be a noise cap, such as described with respect to FIGS. 1-6, to generate a sound with a particular frequency. The vibrational cap 912 can include a tensioned cord that is fixed at its two ends to the securement feature 904. One or more properties, such as tension, material, thickness, etc., of the tensioned cord can be adjusted to select the frequency. The tensioned cord can be a metallic cord, a wrapped cord with a metal core, an elastic band, or other suitable material to allow for generation of a sound with a particular frequency.

In some examples, the slider cap can be positioned within a separate housing 920 that can be installed and/or removed from the securement feature 904 of any of the wearable devices illustrated herein. Likewise, any example of a vibrational cap 912 can be confined within a distinguishable housing 920 that can allow the vibrational cap 912 to be modular. Some examples can also allow for the various noise caps to be integrated with the securement feature 904 to be irremovably fixed to the securement feature 904. In other examples, the vibrational cap 912 can be mechanically fixed to the securement feature 904 without a need for the separate housing 920.

FIG. 10 illustrates a textured noise cap 1012, according to one example. In at least one example, the textured noise cap 1012 can be textured directly on a securement feature, such as a strap as described with respect to FIGS. 1-5. In other examples, the textured noise cap 1012 can be confined within a distinguishable housing that can allow the textured noise cap 1012 to be modular.

In at least one example, the textured noise cap 1012 can have a textured surface configured to generate a sound with a particular frequency upon interaction of an external element with the textured surface. The textured surface can include substantially parallel rows spaced such that when a user runs their finger, fingernail, or other object across the texture, the sound with the particular frequency is generated. The frequency of the sound can be selected at the time of manufacturing by selecting various properties, such as material, row spacing, and row details. Row details can refer to the specific pattern of a single row. For example, as depicted in FIG. 10, a single row can be characterized as having a wave shape. In other examples, a single row can be straight, zig-zag, hatched, etc. In various examples, the rows can run along a direction of the securement feature, transverse (e.g., perpendicular) to the securement feature, or at any intermediate angle (e.g., 10 degrees, 30 degrees, 45 degrees, etc.). The textured surface can include materials such as metal, plastic, silicone, ceramic, or any other suitable material to generate the sound with the particular frequency.

FIG. 11 illustrates a textured noise cap 1112, according to one example. In at least one example, the textured noise cap 1112 can be textured directly on a securement feature, such as a strap, as described with respect to FIGS. 1-5. In other examples, the textured noise cap 1112 can be confined within a distinguishable housing that can allow the textured noise cap 1112 to be modular.

In at least one example, the textured noise cap 1112 can have a textured surface configured to generate a sound with a particular frequency upon interaction of an external element with the textured surface. The textured surface can include a grid pattern such that when a user runs their finger, fingernail, or other object across the texture, the sound with the particular frequency is generated. The frequency of the sound can be selected at the time of manufacturing by selecting various properties, such as material, grid point size, and grid point spacing. Grid point size can refer to the size (and/or shape) of each point that makes up the grid pattern. The textured surface can include materials such as metal, plastic, silicone, ceramic, or any other suitable material configured to generate the sound with the particular frequency.

In general, any of the noise caps described herein, such as the snap cap 712, the slider cap 812, the vibrational cap 912, and the textured caps 1012 and 1112, can be configured to generate a mechanical vibration additionally or alternatively to the sound. The mechanical vibration can similarly be characterized by a frequency and can propagate through the securement feature (rather than through air, as is the case for a sound) and can be received by a vibration sensor. A smart watch or other wearable electronic device could perform the methods and techniques described herein for performing an operation based on the received frequency of the mechanical vibration.

In some examples, such textured noise caps 1012 and 1112 can be advantageous in certain situations, especially when the user has limited fine dexterity. For example a diver can rub a textured noise cap under water and the motion can generate the sound. This method of sound generation can be useful in any number of situations where dexterity could be an issue or access to the noise cap by an opposing hand could be a problem. As can be appreciated, the wearable device can be programmed or trained to recognize the generated frequency of the textured surface when activated by any means such as a hand, rubbing on a piece of clothing, or any other desired and/or suitable activation method. As such the functionality of the wearable device can be greatly expanded without the addition of encumbering electronics and components that would use valuable real estate on the wearable device. Any suitable combination of external and internal or integrated frequency generators could be used in any number of examples to allow for greater functionality.

Other textured surfaces that can be used to generate a sound with a particular frequency include concentric patterns (such as concentric ellipses, rectangles, triangles, etc.), diagonal parallel lines, cross hatches, arbitrary designs (e.g., if a user wanted a specific logo, symbol, or artwork), random lines or bumps, etc.

It is worth noting that other examples of noise generators in addition to the examples of FIGS. 7-11 can be used. In one example, a noise generator can be a tensioned membrane, similar to a drum, and can be made of polyester, BoPET, plastic, metal, etc. In one example, a noise generator can be an electronic buzzer that can be powered separately from the smart watch (e.g., via a button battery, a rechargeable battery, solar power, etc.).

Any of the features, components, and/or parts, including the arrangements and configurations thereof shown in FIGS. 7-11 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 7-11.

Figure 12:
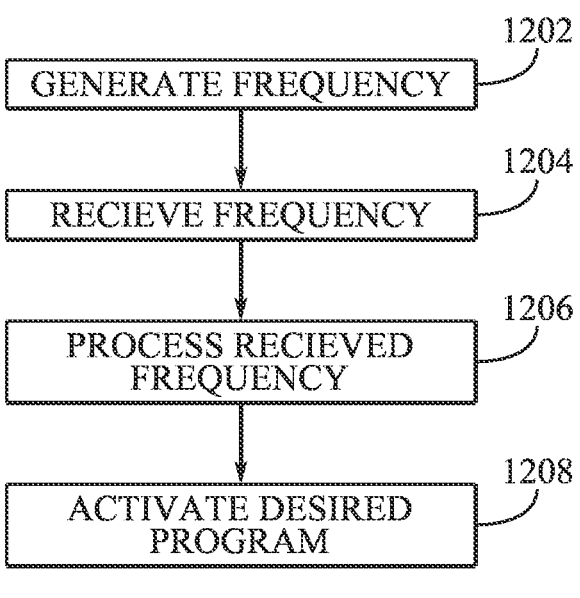
FIG. 12 illustrates a method flowchart of band to watch communication to perform an operation, according to one example.

FIG. 12 illustrates a method flowchart of band to watch communication to perform an operation, according to one example. In at least one example, a smart watch (or other electronic device) can generate a sound with a frequency (block 1202). The sound can be generated by a noise generator, which can be or can include a noise cap of the smart watch or an external source. The smart watch can receive the sound (block 1204). The sound can be detected and measured via a microphone, a mechanical sensor, a piezoelectric sensor, or the like. The smart watch can process the sound (block 1206). In particular, the smart watch can identify the frequency of the sound, for example, by identifying the dominate frequency of the sound. The smart watch can perform an operation (block 1208). The smart watch can determine the operation to be performed based on the frequency.

Figure 13:
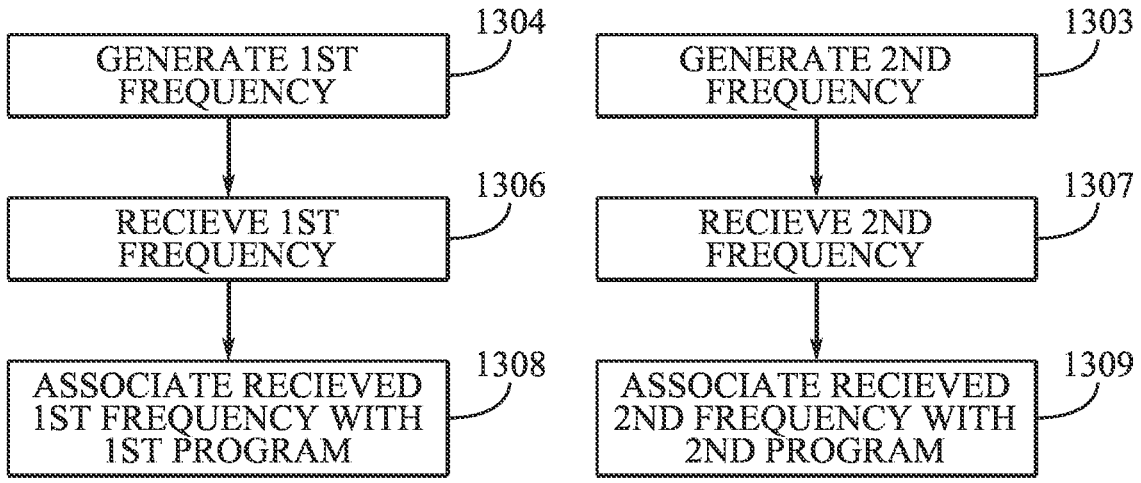
FIG. 13 illustrates a method flowchart of band to watch communication to assign a first sound to perform a first operation and a second sound to perform a second operation, according to one example.

FIG. 13 illustrates a method flowchart of band to watch communication to assign a first sound to perform a first operation and a second sound to perform a second operation, according to one example. The smart watch can be pre-programmed to associate a given frequency with a given operation. For example, a sound with one frequency could open up a first application, a sound with another frequency could start a routine, a sound with another frequency could start/pause a media player, a sound with another frequency could start a timer, etc. In some examples, repeating a sound with a certain frequency could stop the operation or perform steps within the operation (e.g., adding laps in a timer).

In at least one example, a smart watch can generate a first sound with a first frequency (block 1304). The smart watch can receive the first sound with the first frequency (block 1306). The smart watch can associate the first frequency with a first operation (block 1306). Additionally or alternatively, a smart watch can generate a second sound with a second frequency (block 1304). The smart watch can receive the second sound with the second frequency (block 1307). The smart watch can associate the second frequency with a second operation (block 1309).

In some examples, the user of the smart watch can assign specific sounds with their respective frequencies to specific operations. In some examples, certain sounds can be pre-associated with specific operations (e.g., by a manufacturer of the smart watch). In some examples, certain sounds with their respective frequencies can be re-associated with different operations.

Figure 14:
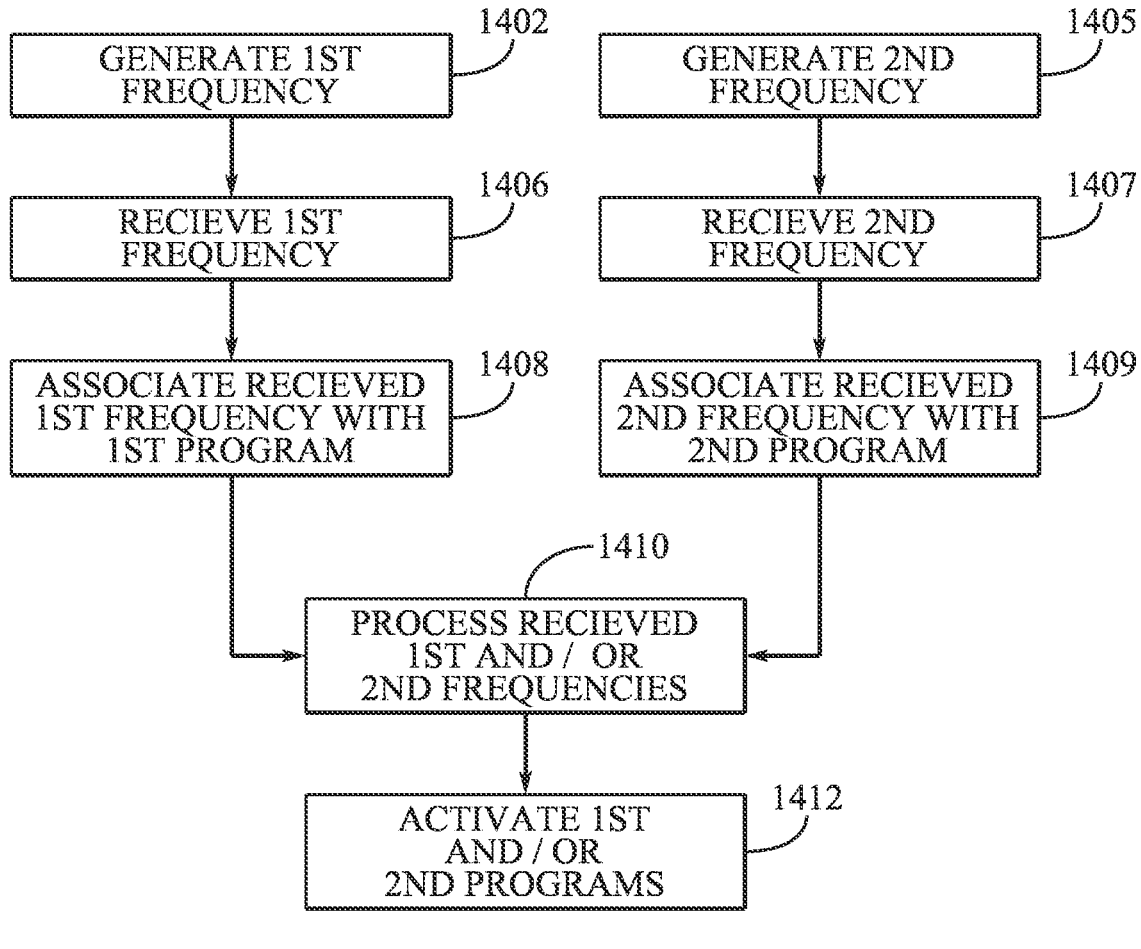
FIG. 14 illustrates a method flowchart of band to watch communication to perform one or more operations, according to one example.

FIG. 14 illustrates a method flowchart of band to watch communication to perform one or more operations, according to one example. The blocks 1402-1409 can represent steps that are substantially similar to steps 1302-1309 of FIG. 13. In at least one example, the smart watch can process sounds which are received (block 1410). The sounds can include the first sound, the second sound, and/or additional sounds (which can include other stored sounds (e.g., a third, fourth, fifth sound) or background noise). Based on identifying the first frequency, the smart watch can perform the first operation; and based on identifying the second frequency, the smart watch can perform the second operation (block 1412).

In at least one example, the smart watch can receive the first sound and the second sound simultaneously, and can perform the first operation and the second operation (either simultaneously or in an appropriate order).

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not intended to be exhaustive or to limit the examples to the precise forms disclosed. It will be apparent to one of ordinary skill in the art that many modifications and variations are possible in view of the above teachings.

What is claimed is:

1. A wearable electronic device, comprising:
a housing defining an internal volume;
a securement band connected to at least a first side and a second side of the housing and extending between the first side and the second side;
a noise generator disposed on the securement band and configured to generate a signal with a frequency including an audible sound;
a receiver disposed within the internal volume configured to detect the signal; and
a processor disposed within the internal volume and in communication with the receiver, the processor configured to process the signal and perform an operation in response to the signal.

2. The electronic device of claim 1, wherein:
the electronic device comprises a watch.

3. The electronic device of claim 1, wherein the noise generator comprises at least one of a snap cap, a slider cap, or a vibrational cap.

4. The electronic device of claim 3, wherein the slider cap comprises:
an elongated groove with a first end and a second end; and a slider block disposed within the groove and configured to move between the first end and the second end such that an impact of the slider block against the first end generates the signal.

5. The electronic device of claim 1, wherein the securement band defines a textured surface configured to generate the signal by an interaction of an external element with the textured surface.

6. The electronic device of claim 1, wherein the noise generator comprises a first noise generator, the signal comprises a first signal, the frequency comprises a first frequency, and a first operation, the electronic device further comprising a second noise generator configured to generate a second signal with a second frequency.

7. The electronic device of claim 6, wherein:
the second frequency and the first frequency are different; and
the processor is configured to process the second signal and perform a second operation in response to the second signal.

8. The electronic device of claim 6, further comprising a second receiver disposed within the internal volume, wherein:
the first receiver receives the first signal at a first time;
the second receiver receives the first signal at a second time, different than the first time;
the processor is configured to perform the first operation in response to receipt of the first signal at the first time and the second time;
the first receiver receives the second signal at a third time;
the second receiver receives the second signal at a fourth time, different than the third time; and
the processor is configured to perform a second operation in response to receipt of the second signal at the third time and the fourth time.

9. The electronic device of claim 1, wherein the processor is configured to perform the operation based on the frequency.

10. The electronic device of claim 1, wherein the signal comprises an acoustic wave.

11. The electronic device of claim 1, wherein the noise generator is removably connected to the securement band.

12. A strap for a smart watch including a microphone, the strap comprising:
a first noise cap mechanically coupled to the strap at a first position, and configured to interface with the watch; and
a second noise cap configured to interface with the watch mechanically coupled to the strap at a second position.

13. The strap of claim 12, wherein the first noise cap and the second noise cap each comprise at least one of a snap cap, a slider cap, or a vibrational cap.

14. The strap of claim 12, wherein:
the first noise cap generates a noise having a first frequency; and
the second noise cap generates a noise having a second frequency, different from the first frequency;
each of the first frequency and the second frequency corresponding to a different operation performed by the watch when detected.

15. The strap of claim 12, wherein:
the first noise cap is removably coupled to the strap; and
the second noise cap is removably coupled to the strap.

16. A wearable programmable electronic device, comprising:
a housing defining an internal volume;
a securement band mechanically coupled to the housing;

a sound generator operatively coupled to the securement band, the sound generator configured to generate a signal with a frequency;

a receiver disposed within the internal volume, wherein the receiver is configured to receive the signal; and a processor connected to the receiver, the processor configured to operate a program based on the frequency.

17. The programmable electronic device of claim 16, wherein the frequency comprises a user-defined frequency.

18. The programmable electronic device of claim 17, wherein the user-defined frequency is associated with the program.

19. The programmable electronic device of claim 17, wherein the signal is produced by an external sound generator.

* * * * *